Nov. 7, 1967     A. D. SPENCER     3,351,323
MULTIPLE USE PLAY YARD CONSTRUCTION FOR CHILDREN
Filed Feb. 1, 1967     5 Sheets-Sheet 1
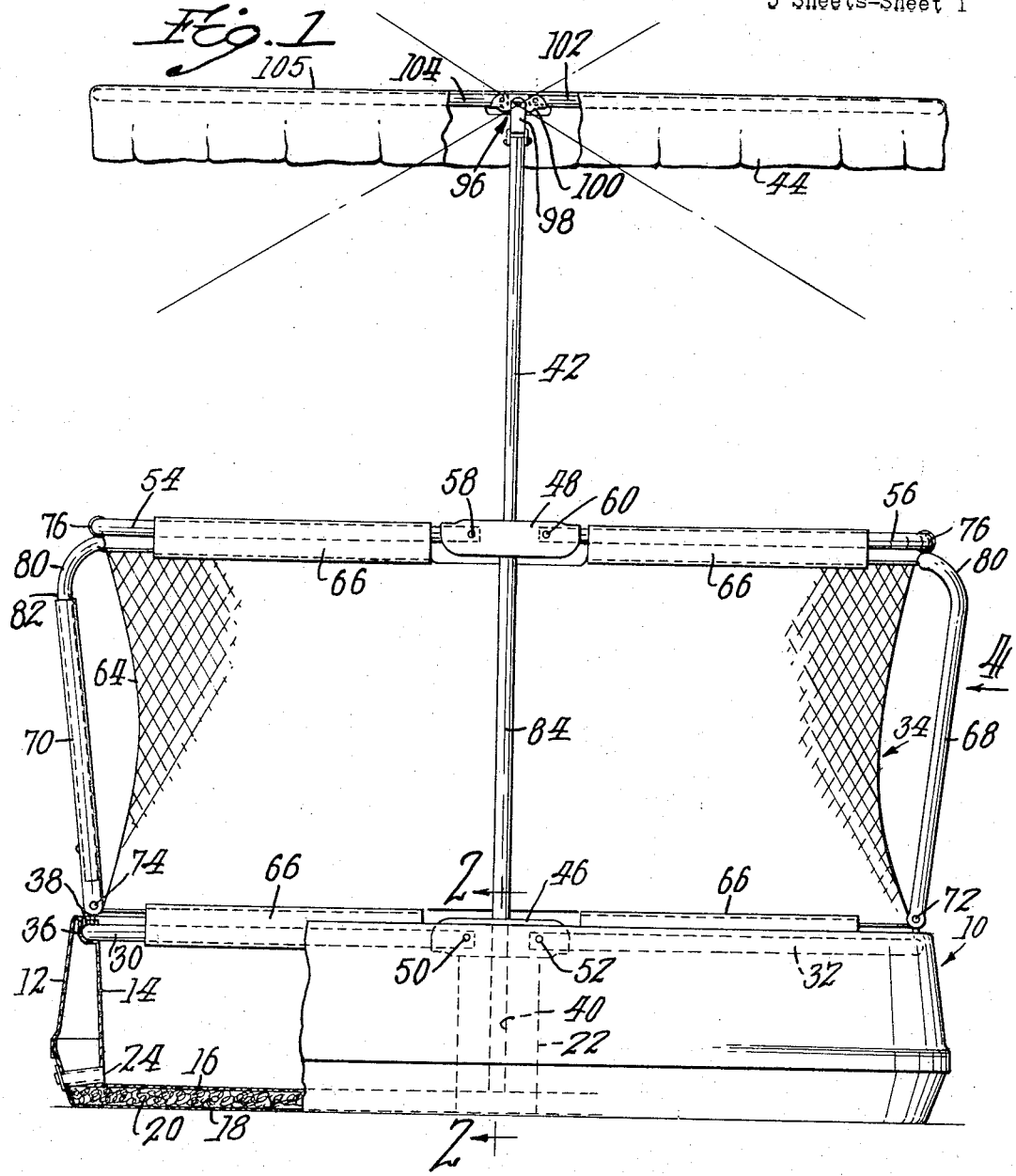
Inventor
Aaron D. Spencer
By Charles R. Jay,
Attorney

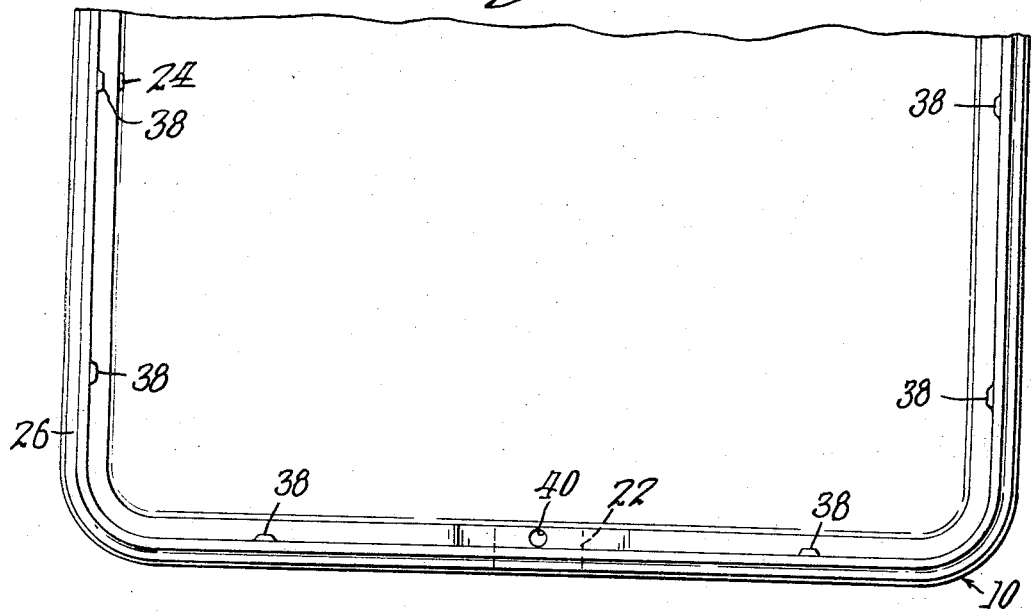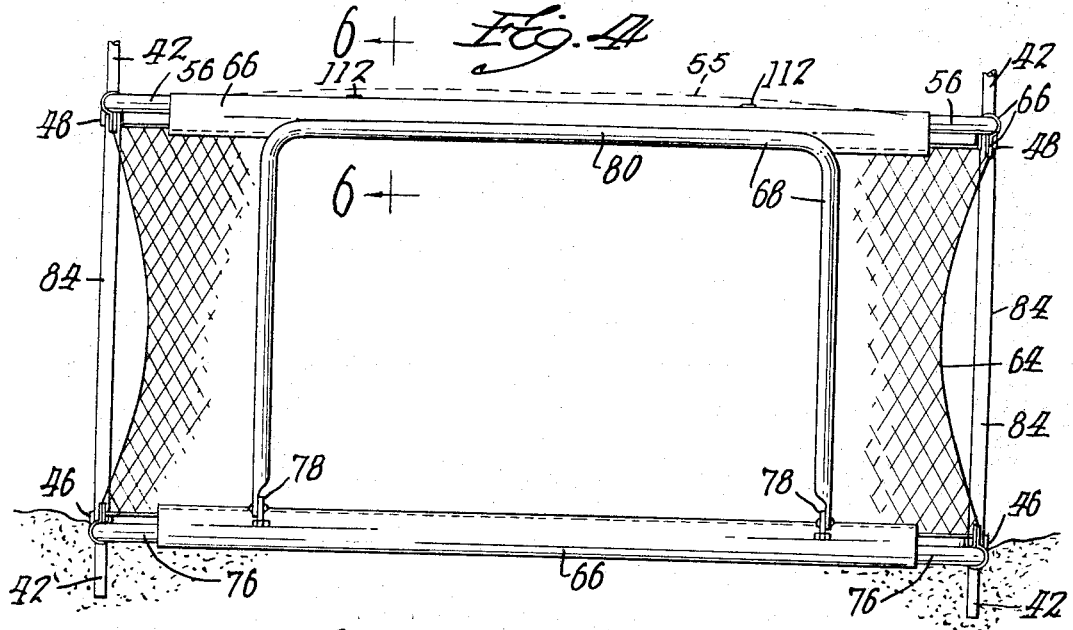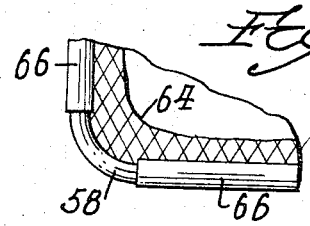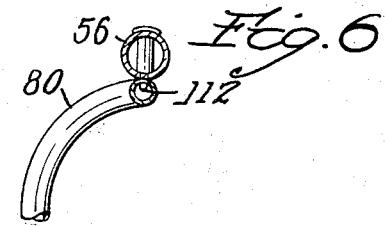

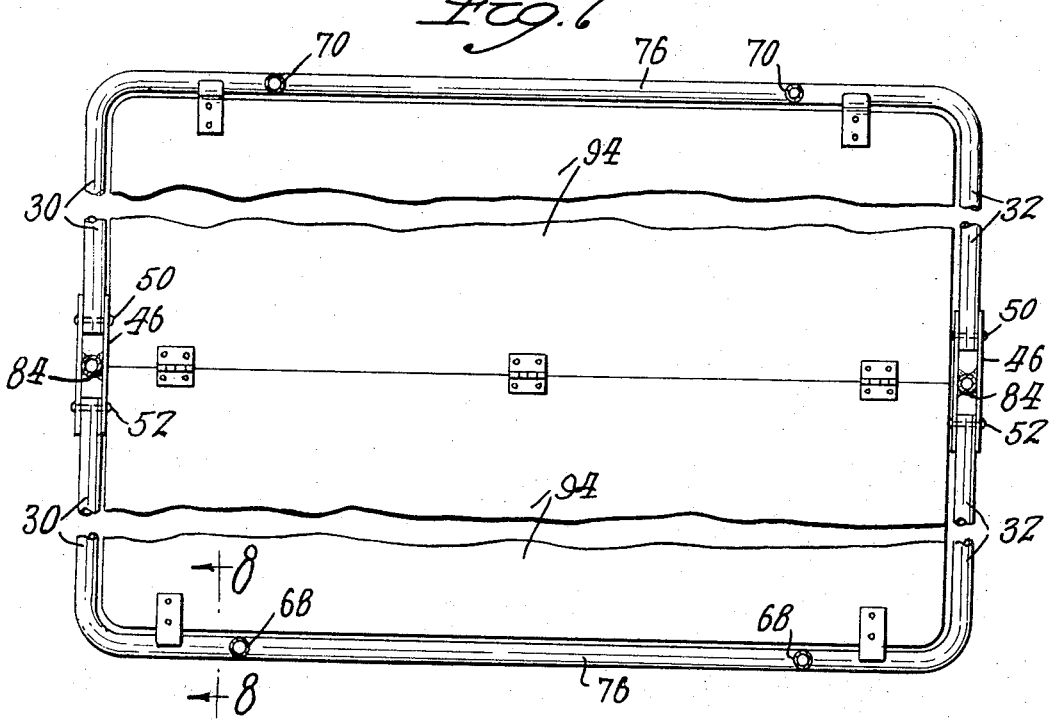
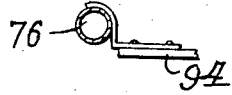
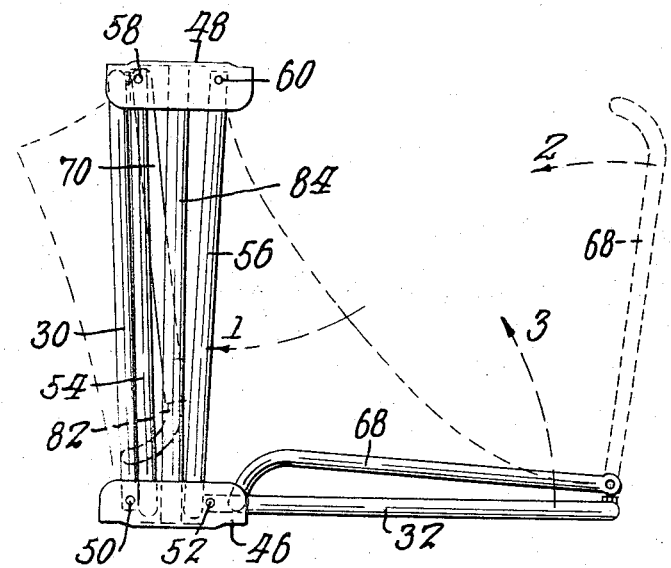

Nov. 7, 1967          A. D. SPENCER          3,351,323
MULTIPLE USE PLAY YARD CONSTRUCTION FOR CHILDREN
Filed Feb. 1, 1967                    5 Sheets-Sheet 4

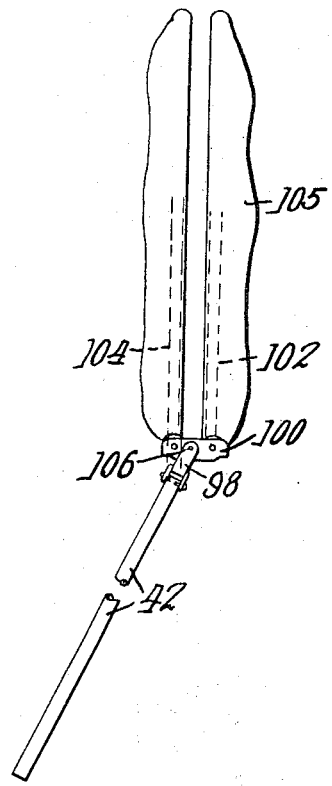
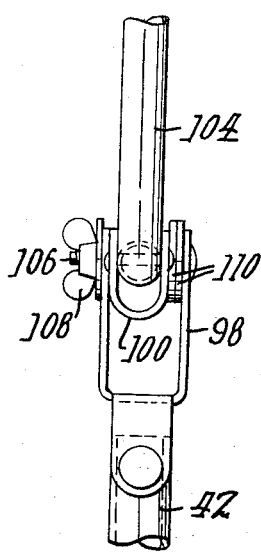
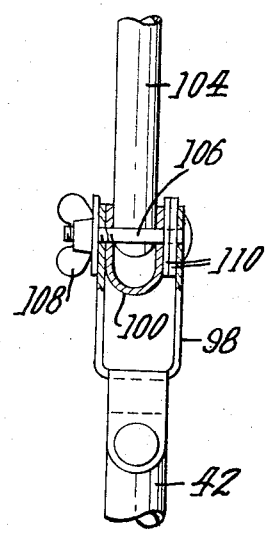
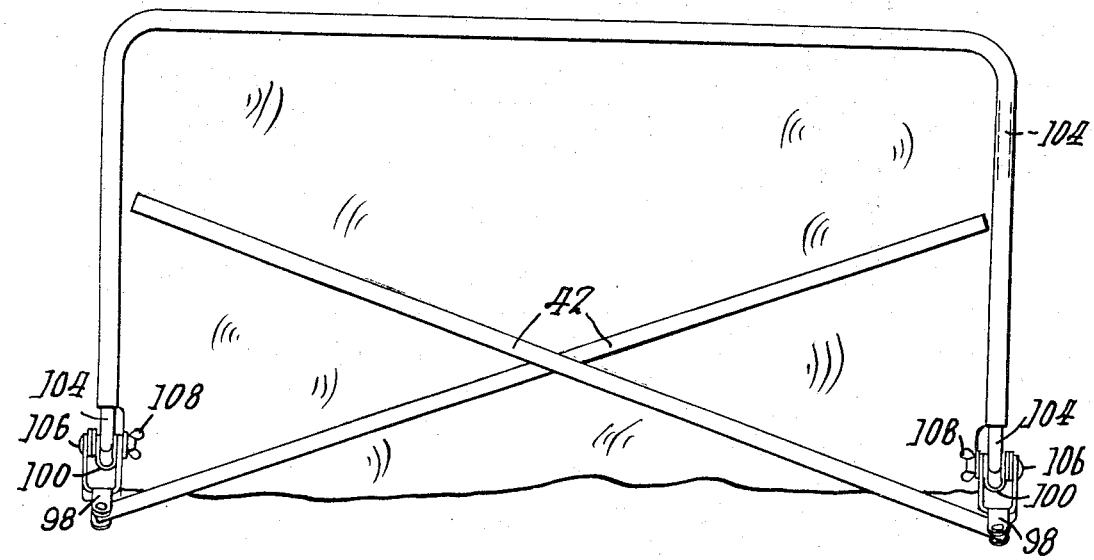

3,351,323
MULTIPLE USE PLAY YARD CONSTRUCTION FOR CHILDREN
Aaron D. Spencer, 143 Shaker Road,
East Longmeadow, Mass. 01106
Filed Feb. 1, 1967, Ser. No. 613,176
10 Claims. (Cl. 256—25)

This is a continuation-in-part of my application Ser. No. 396,123, filed September 14, 1964, and includes improvements thereon in addition to providing for a similar general combination of parts.

The principal object of the present invention resides in the provision of a generally floor-less folding play yard construction which may be used in extended condition and mounted on an enclosure which can form a wading pool or a sandbox, etc.; alternatively the same structure may be folded to a mid-way position wherein it can be used as car-bed enclosure, or a seat-bed enclosure; it may be used on the ground as for instance on a sandy beach in extended condition; and it may be folded into a very compact arrangement which is easily carried by the mother in one hand when moving from one place to another such as from the home to the beach, etc.

Other objects include the provision of a removable floor, a new and improved detachable and adjustable awning or canopy for the play yard structure, and a certain new and improved folding linkage for the play yard.

Other objects and advantages of the invention will appear hereinafter.

Reference is to be had to the accompanying drawings in which:

FIG. 1 is a view in elevation, parts being in section, illustrating the play yard in extended condition and mounted on a lower open-top box-like member for use as an infant enclosure with a sandbox or wading pool;

FIG. 2 is a section on line 2—2 of FIG. 1;

FIG. 3 is a top plan view illutsrating the box-like member, part being broken away;

FIG. 4 is a view in elevation looking in the direction of arrow 4 in FIG. 1;

FIG. 5 is a partial plan view showing a corner construction of one of the frames;

FIG. 6 is a section on line 6—6 of FIG. 4;

FIG. 7 is a plan view of the bottom frame of the play yard shown in extended condition and with a detachable foldable floor mounted thereon;

FIG. 8 is a section on line 8—8 of FIG. 7;

FIG. 9 is an edge view of the floor member of FIG. 7 shown in folded condition;

FIG. 10 is an end view of the play yard illustrating its folding action;

FIG. 13 is an end elevational view of the folding canopy;

FIG. 14 is a view on enlarged scale looking in the direction of arrow 14 in FIG. 13;

FIG. 15 is a view similar to FIG. 14 with parts in section; and

FIG. 16 is a view showing the canopy in folded condition.

Figure 11:
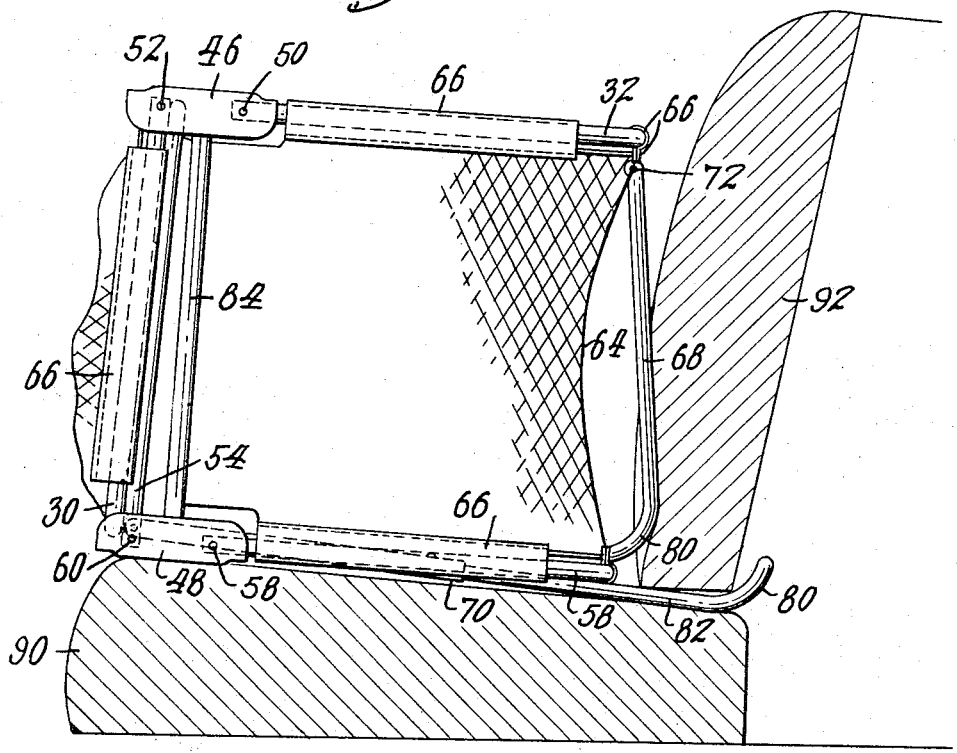
FIG. 11 is an end elevation showing the play yard folded to comprise one-half of its maximum area and utilized as a car-bed.

In illustrating the invention, attention is directed to FIGS. 1, 2 and 3 wherein is shown the base enclosure generally indicated at 10. This is preferably a double walled plastic square or rectangular device, although the invention is not limited to such a shape. The double walled construction can be seen in FIGS. 1 and 2 at 12 and 14 as to the side walls, 16 and 18 as to the bottom. Expanded cellular plastic material as at 20 can be utilized between the surfaces 16 and 18 and also between those at 12 and 14 if desired, but it has been found that simply providing constructional reinforcing members such as blocks 22 is sufficient to hold the parts together in a rigid relationship. Drain holes and plugs as at 24 may also be provided to allow water to escape out of the play yard if this should be found to be desirable.

The double walled construction gradually tapers or converges in an upward direction terminating in a rim portion 26. This rim portion is provided with a channel construction, see 28, which actually is in the form of a two-sided depression located in the inner periphery of the upper edge of the walls 12 and 14 and it is provided for the purpose of receiving and holding the U-shaped bottom frame members 30 and 32 of the folding frame generally indicated at 34 to be described more fully hereinafter. The depression has an upright wall facing inwardly as indicated at 36 and this wall is provided with inwardly directed detents 38, see particularly FIG. 3. These hold the frame members 30 and 32 in position because of the fact that it is necessary to snap the frames 30 and 32 past the projections 38, and it will be seen that the ends of the frame 30, 32 when extended, abut the upright walls 36 of the depressions. Thus the lower frame member of the play yard is releasably but very firmly held in a strong, light-weight sandbox or pool. Certain of the reinforcements may be apertured as at 40 for the reception of the uprights 42 of the canopy 44 so that the canopy is actually mounted directly onto the base enclosure 10.

The play yard itself is shown in extended condition in FIGS. 1 and 4; the bottom frame is shown in extended condition in FIG. 7, and the manner in which it is folded into a compact arrangement is shown in FIG. 10.

Essentially the play yard comprises a pair of U-shaped brackets 46, 48 at each end. Looking at FIG. 1 for instance, these brackets are clearly shown and it is pointed out that this construction is duplicated at the opposite side of the structure. The two U-shaped preferably tubular frame members 30 and 32 are pivoted as at 50 and 52 to the bracket 46. For instance, frame 30 is pivoted at 50 and frame 32 is pivoted at 52, and it will be seen that frame members 30 and 32 are foldable to a more or less parallel position as in FIG. 7, or are extended in coplanar relationship as in FIG. 1.

The brackets are U-shaped in section to foldingly receive the parts of the frames 30 and 32 adjacent the brackets.

The upper frame structure is substantially the same as that described as to the lower frame structure, there being two U-shaped members preferably made of tubular material and indicated at 54 and 56 pivoted at 58 and 60 to U-shaped bracket plate 48 of the same construction as bracket plate 46 but inverted. The more or less conventional netting 64 is mounted on these U-shaped members by means of hems 66 and the like. Actually the entire extensible play yard construction can be used with either side up as the frame members are substantially the same and this construction provides an open bottom play yard for use on the ground or on the beach, etc.

A pair of side positioned U-shaped members 68 and 70 are pivoted as at 72 and 74 to the portions of the frames 30 and 32 which form the closed ends of the U-shaped structure thereof, this closed end being indicated by the reference numeral 76 in FIG. 4.

U-shaped members 68 and 70 can be mounted on ears or the like 78 also mounted on the members 76 and extending through the adjacent hem 66. It is pointed out that these side U-shaped members have their attachments offset from each other so that they can fold past each other in more compact form and this is perhaps best illustrated in FIG. 7. It is also to be noted that the closed ends of the side U-shaped members 68, 70 are bent somewhat inwardly as indicated at 80 and when they are swung up to an upright position, see FIG. 1, they snap under i.e., slightly past the closed ends of the U-shaped frame members 54 and 56, being held in this position by any convenient means e.g. pins 112 snapping into appropriate notches, or the like, see FIG. 6. However the arrangement is such that it is easy enough to slightly lift the end members of the frames 54 and 56 to release this condition and allow the side U-shaped members 68 and 70 to be folded.

The side U-shaped member 68 is rigid but at 70 is extensible being formed by an outside tube and telescoping inside extending end member 82 for a purpose to be described.

Now looking at FIG. 1, it being desired to remove the play yard construction from the base construction, the outer end members of the U-shaped frames 54 and 56 are manually moved upwardly against the tension of the side walls 64, see dotted lines at 55 in FIG. 4, to release the end members of each side of the U-shaped members therefrom, whereupon the U-shaped members 54 and 56 are both foldable downwardly to the position shown in FIG. 10, and in this position they more or less come up to and engage a center strut 84 secured to brackets 46 and 48 and holding them rigidly separated at all times.

The side U-shaped members 68 and 70 are then folded inwardly as indicated in FIG. 10 and then the U-shaped members 32 and 68 together are folded upwardly to a generally parallel position with respect to the U-shaped member 56 in this figure. This action is repeated as to the side U-shaped member 70 and frame 30 and when these parts have been folded as indicated, a very compact lightweight play yard without a floor is provided which can be easily carried from an automobile to a beach, etc.

Referring to FIG. 10, this action has been indicated by arrows 1, 2 and 3 wherein the arrow 1 indicates folding of frame 56 inwardly and downwardly, then arrow 2 indicates folding frame 68 down onto frame 32; and member 3 fold is for frames 32 and 68 to be folded together upwardly. The parts will then lock similar to the folded frames 30 and 70, the side U-shaped member 70 having been in-folded relative to the pivot 50 in the way described above as to frames 68 and 32. Since the frames 68 and 70 are offset from each other, they will move past each other in the folded condition in order to ensure that the entire apparatus is generally within the confines of the brackets 48 and 46.

Figure 12:
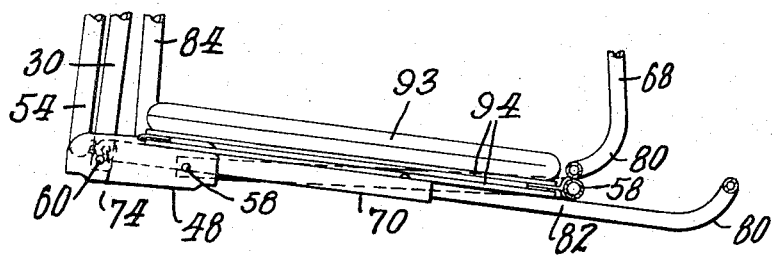
FIG. 12 is a detail view illustrating the action of the parts shown in FIG. 11.

Now to utilize the device as a car-bed enclosure, reference is made to FIGS. 11 and 12 wherein the character 90 represents a seat and 92 the backrest portion of a vehicle's seat. In this case the U-shaped frames are both utilized but one of the frames i.e., the bottom frame 30, to which the extensible side U-shaped frame 70 is pivoted, is folded into general parallelism with strut 84 and so is its companion top frame 54. Strut 68 holds the frames 32 and 56 separated. The entire device is now inverted and the strut 70 is swung around to approximately a 270° arc to underlie the now one-half size enclosure. The extension 82 is pulled outwardly so as to be inserted between the lower portion of the back 92 into seat 10 as clearly shown in FIG. 11. This will of course cause the members 70 to extend across the car-bed, and a pad 93 or floor 94 is put on these members for padding.

The side struts 84 are preferably hollow and are welded between the brackets 46 and 48. These struts slidably and detachably receive struts 42 for holding the canopy 44 in position above the play yard. In the FIG. 1 showing, the struts 42 will merely touch or almost touch the ground as they extend to the bottom of the main base 10, but when the main base is removed and the play yard used in the sand for instance as shown in FIG. 4, these struts are pushed downwardly into the sand and serve to anchor the open bottom of the play yard as shown.

At their upper ends, the struts 42 are connected to hold the canopy in tilted relationship as indicated by the broken lines in FIG. 1 and also to be folded into compact relationship having approximately the dimensions of the play yard itself when folded by means of generally universal brackets 96. These brackets are best shown in FIGS. 13, 14 and 15. At its top end, each strut 42 is pivoted to a bifurcated or U-shaped member 98 in turn pivoted to a channel-shaped bracket 100 extending generally transversely with respect thereto and in turn being pivoted to a pair of U-shaped frames 102 and 104 upon which the fabric 105 of the canopy is arranged.

The pivot between the U-shaped bracket 100 and the corresponding ends of the U-shaped frames 102 and 104 comprises a bolt or the like 106 with a corresponding thumbnut 108 which by the use of friction washers 110 or the like may be used to rigidify the construction in the desired extended location or situation as in FIG. 1.

However at the same time this allows the struts 42 to be in-folded within the areas of the frames 102 and 104 so that the area of the folded condition of the canopy, that is with the parts in the FIG. 13 position and the struts 42 in-folded with reference to their brackets 92, allows for an extremely compact folding arrangement. It will be seen that the mother can take the folded play yard in one hand and the folded canopy in the other hand and easily carry these from place to place as desired.

Having thus described my invention and the advantages thereof, I do not wish to be limited to the details herein disclosed, otherwise than as set forth in the claims, but what I claim is:

1. A child's enclosure comprising a pair of continuous frames, each frame being open and floorless, each frame including a pair of U-shaped members, means pivoting the free ends of each pair of U-shaped members relatively to each other in each frame to provide for folding the frames, rigid center elements extending between the frames from pivot axes to pivot axis of the U-shaped members spacing the same, flexible material secured to and extending between the two frames and the frames being generally parallel and coextensive when extended, a U-shaped member of each frame having a counterpart U-shaped member in the other frame.

movable means located between each two counterpart U-shaped members at points remote from the pivot axes of the U-shaped members and selectively positioned for holding the frames extended in parallel, spaced relation, or selectively released from a frame to allow folding.

2. The child's enclosure of claim 1 wherein one U-shaped member of each frame is selectively interfoldable with the corresponding U-shaped member of the other frame to form a single wall of a half-sized enclosure without a floor.

3. The child's enclosure of claim 2 wherein one of said means for holding the frames extended being reversely foldable under said half-size enclosure to form an anchor therefor extending outwardly beyond the limits of the other two counterpart U-shaped members.

4. The child's enclosure of claim 1 wherein each of the movable means for holding the frames extended comprises a free-end strut in pivotal relation with one counterpart U-shaped member and selectively engaging the other counterpart U-shaped member or releasing it.

5. The child's enclosure of claim 1 wherein each of the movable means for holding the frames extended comprises a free-end strut in pivotal relation with one counterpart U-shaped member and selectively engaging the other counterpart U-shaped member or releasing it, the flexible material allowing sufficient spring of the other counterpart member to permit the free end to pass it slightly and to be held in frame extended position thereby.

6. The child's enclosure of claim 1 wherein each of the movable means for holding the frames extended comprises a free-end strut in pivotal relation with one counterpart U-shaped member and selectively engaging the other counterpart U-shaped member or releasing it, and interengaging means to releasably hold the strut to the member.

7. The child's enclosure of claim 1 including a canopy, standards for said canopy, and means mounting said standards on said elements for holding the canopy erect.

8. A child's enclosure comprising a first pair of U-shaped members, a pair of brackets to which the corresponding free ends of the arms of the members are connected, a second pair of U-shaped members, a pair of brackets to which the corresponding free ends of the arms of the second pair of U members are connected, a pair of elongated bracket struts connecting the brackets in pairs, each of the pairs of U-shaped members being capable of being placed in a coplanar relationship in which the pairs of U-shaped members form closed frames arranged in parallel relationship and are spaced at least in part by said elongated bracket struts, a frame strut in pivotal relationship with respect to the closed end portion of each one of the pairs of U-shaped members, said frame struts being selectively foldable into parallelism with its respective U-shaped member or moved to a general right angular relationship therewith, wherein it extends to the closed end portion of a corresponding U-shaped member in the other frame, said frame struts maintaining the respective frames in said horizontal spaced parallel condition, and flexible material connected to and extending between the respective frames, said material being stretched upon engagement of the frame struts with respect to the closed end portions of the other said U-shaped members and forming a continuous wall approximately of the outline of the frames, said enclosure being open at top and bottom thereof.

9. The child's enclosure of claim 8 wherein each frame strut has a free end portion releasably engageable with the corresponding closed end portion of the other frame at the side thereof within the frame.

10. The child's enclosure of claim 8 including releasable interengaging means between each frame strut and the corresponding closed end portion of the other frame, said releasable interengaging means including an aperture and detent construction releasable by urging the said corresponding closed end portion of the other frame away from its engaged frame strut still further stretching said flexible material.

References Cited

UNITED STATES PATENTS

| | | | |
|---|---|---|---|
| 1,742,313 | 1/1930 | Hooper | 5—99 |
| 1,748,932 | 2/1930 | Medart et al. | 5—99 |
| 2,659,903 | 11/1953 | Hagelfeldt | 5—99 |
| 3,092,847 | 6/1963 | De Puy | 5—99 |
| 3,158,876 | 12/1964 | Gottlieb | 5—99 |
| 3,206,773 | 9/1965 | Sarasin | 5—99 |
| 3,233,254 | 2/1966 | Golub et al. | 5—99 |
| 3,309,718 | 3/1967 | Sarasin | 5—99 |

DAVID J. WILLIAMOWSKY, *Primary Examiner.*

DENNIS L. TAYLOR, *Examiner.*